(12) United States Patent
Yanagisawa et al.

(10) Patent No.: US 7,044,719 B2
(45) Date of Patent: May 16, 2006

(54) ENCLOSED COMPRESSOR WITH VIBRATION REDUCTION

(75) Inventors: Masanori Yanagisawa, Sakai (JP);
Ryouhei Deguchi, Sakai (JP);
Kazuhiko Matsukawa, Sakai (JP);
Hiroshi Kitaura, Sakai (JP)

(73) Assignee: Daikin Industries, Ltd, Osaka (JP)

( * ) Notice: Subject to any disclaimer, the term of this patent is extended or adjusted under 35 U.S.C. 154(b) by 39 days.

(21) Appl. No.: 10/476,595

(22) PCT Filed: Dec. 26, 2002

(86) PCT No.: PCT/JP02/13726

§ 371 (c)(1),
(2), (4) Date: Oct. 31, 2003

(87) PCT Pub. No.: WO03/064859

PCT Pub. Date: Aug. 7, 2003

(65) Prior Publication Data

US 2005/0002804 A1    Jan. 6, 2005

(30) Foreign Application Priority Data

Jan. 30, 2002    (JP) .............................. 2002-021237

(51) Int. Cl.
*F01C 1/063* (2006.01)
(52) U.S. Cl. ...................................... 417/410.5; 418/55
(58) Field of Classification Search ............. 417/410.5; 418/55.4, 55.1
See application file for complete search history.

(56) References Cited

U.S. PATENT DOCUMENTS

| 2,738,122 | A | 3/1956 | Gardiner |
| 5,591,018 | A | 1/1997 | Takeuchi et al. |
| 6,234,768 | B1 | 5/2001 | Harakawa et al. |
| 6,264,446 | B1 * | 7/2001 | Rajendran et al. ......... 418/55.6 |
| 6,281,607 | B1 | 8/2001 | Petach et al. |

FOREIGN PATENT DOCUMENTS

| EP | 0855511 | 7/1998 |
| JP | 56-124280 | 9/1981 |
| JP | 56-152883 | 11/1981 |
| JP | 59-82595 | 5/1984 |
| JP | 62-126285 | 6/1987 |
| JP | 2-275071 | 11/1990 |
| JP | 5-164065 | 6/1993 |
| JP | 5-177757 | 7/1996 |
| JP | 10-299681 | 11/1998 |
| JP | 2000-179463 | 6/2000 |

* cited by examiner

*Primary Examiner*—Charles G. Freay
(74) *Attorney, Agent, or Firm*—Shinjyu Global IP Counselors, LLP

(57) ABSTRACT

Disclosed is an enclosed type compressor in which a scroll type compression mechanism and an electric motor are attached firmly to a casing, with the scroll type compression mechanism and the electric motor in contact with an inner face of the casing. Formed in a plane orthogonal to the longitudinal direction of the casing are a contact part of the casing which makes contact with the scroll type compression mechanism (the electric motor) and a non-contact part of the casing which does not make contact with the scroll type compression mechanism (the electric motor). The non-contact part with respect to the scroll type compression mechanism has a peripheral length different from that of the non-contact part with respect to the electric motor.

9 Claims, 4 Drawing Sheets

US 7,044,719 B2

ENCLOSED COMPRESSOR WITH VIBRATION REDUCTION

CROSS-REFERENCE TO RELATED APPLICATIONS

This application is a national stage application filed under 35 U.S.C. 371 of International Application PCT/JP02/13726, filed Dec. 26, 2002, which claims priority to Japanese Patent Application No. 2002-21237, filed Jan. 30, 2002.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

1. Field of Invention

The present invention relates to enclosed type compressors for use in airconditioners or the like. The present invention pertains to techniques for achieving the reduction of vibration and noise from constituent components of such an enclosed type compressor (e.g., a compression mechanism, an electric motor, a bearing et cetera).

2. Description of Related Art

As a compressor for use in airconditioners and refrigerating machines, enclosed type compressors have been known in the art. In such an enclosed type compressor, a compression mechanism, an electric motor, and other constituent components are all housed in a single casing for the purpose of space saving and leakage prevention.

Additionally, in an enclosed type compressor a compression mechanism and a stator of an electric motor are attached firmly to a casing. Consequently, vibrations from the compression mechanism and electric motor travel to the casing, thereby causing the problem that noise is emitted from a wide region of the casing surface.

Such a problem has conventionally been dealt with by improvement in casing rigidity. More specifically, measures of increasing the thickness of a casing itself and of extending the area of contact, for example, between the casing and the compression mechanism have been taken.

However, if the thickness of a casing is increased, this result in the increase in the total weight of a compressor, therefore causing another problem that the costs of materials increase. Accordingly, the costs of production increase.

In addition, enclosed type compressors typically employ a construction in which fluid prior to and posterior to compression flows in the casing. Accordingly, if a means intended for increasing the area of contact between each constituent component and the casing is employed, this reduces the area of fluidflow in the casing. Consequently, smooth movement of the fluid is prevented and the compressor's performance drops.

Bearing in mind the above-mentioned problems, the present invention was made. Accordingly, an object of the present invention is to provide an improved compressor which is quiet and reliable and, in addition, which is able to prevent the increase in compressor weight itself.

BRIEF SUMMARY OF THE INVENTION

The present invention provides a first problem-solving means which is an enclosed type compressor comprising a scroll type compression mechanism (2), an electric motor (3) for driving the compression mechanism (2), and a cylindrical casing (6) for housing the compression mechanism (2) and the electric motor (3).

The compression mechanism (2) and the electric motor (3) are attached firmly to the casing (6), with the compression mechanism (2) and the electric motor (3) in contact with an inside face of the casing (6). In a first plane orthogonal to the longitudinal direction of the casing (6), the casing (6) is in contact with the compression mechanism (2) in a first contact part (20) and is out of contact with the compression mechanism (2) in a first non-contact part (30). In a second plane orthogonal to the longitudinal direction of the casing (6), the casing (6) is in contact with the electric motor (3) in a second contact part (21) and is out of contact with the electric motor (3) in a second non-contact part (31). Additionally, the first non-contact part (30) and the second non-contact part (31) have different peripheral lengths.

The present invention provides a second problem-solving means which is an enclosed type compressor comprising a compression mechanism (2), an electric motor (3) for driving the compression mechanism (2), and a casing (6) for housing the compression mechanism (2) and the electric motor (3).

The compression mechanism (2) and the electric motor (3) are attached firmly to the casing (6), with the compression mechanism (2) and the electric motor (3) in contact with an inside face of the casing (6). In a first plane orthogonal to the longitudinal direction of the casing (6), the casing (6) is in contact with the compression mechanism (2) in a first contact part (20) and is out of contact with the compression mechanism (2) in a first non-contact part (30). In a second plane orthogonal to the longitudinal direction of the casing (6), the casing (6) is in contact with the electric motor (3) in a second contact part (21) and is out of contact with the electric motor (3) in a second non-contact part (31). Additionally, the first non-contact part (30) and the second non-contact part (31) have different peripheral lengths.

The present invention provides a third problem-solving means which is an enclosed type compressor (1) comprising a scroll type compression mechanism (2), an electric motor (3) for driving the compression mechanism (2), a bearing (5) for supporting one end of a drive shaft (4) connecting the compression mechanism (2) and the electric motor (3), and a casing (6) for housing the compression mechanism (2), the electric motor (3), and the bearing (5).

The compression mechanism (2), the electric motor (3), and the bearing (5) are attached firmly to the casing (6), with the compression mechanism (2), the electric motor (3), and the bearing (5) in contact with an inside face of the casing (6). In a first plane orthogonal to the longitudinal direction of the casing (6), the casing (6) is in contact with the compression mechanism (2) in a first contact part (20) and is out of contact with the compression mechanism (2) in a first non-contact part (30). In a second plane orthogonal to the longitudinal direction of the casing (6), the casing (6) is in contact with the electric motor (3) in a second contact part (21) and is out of contact with the electric motor (3) in a second non-contact part (31). In a third plane orthogonal to the longitudinal direction of the casing (6), the casing (6) is in contact with the bearing (5) in a third contact part (22) and is out of contact with the bearing (5) in a third non-contact part (32). Additionally, the first non-contact part (30), the second non-contact part (31), and the third non-contact part (32) have different peripheral lengths, respectively.

The present invention provides a fourth problem-solving means which is an enclosed type compressor according to any one of the first to third problem-solving means, in which a plurality of the first contact parts (20) and a plurality of the first non-contact parts (30) with respect to the compression mechanism (2) are formed in the casing (6). Additionally, at least one of the plurality of the first non-contact parts (30) with respect to the compression mechanism (2) has a peripheral length different from that of the other first non-contact parts (30).

The present invention provides a fifth problem-solving means which is an enclosed type compressor according to any one of the first to third problem-solving means, in which a plurality of the second contact parts (21) and a plurality of the second non-contact part (31) with respect to the electric motor (3) are formed in the casing (6). Additionally, at least one of the plurality of the second non-contact parts (31) with respect to the electric motor (3) has a peripheral length different from that of the other second non-contact parts (31).

The present invention provides a sixth problem-solving means which is an enclosed type compressor according to the third problem-solving means, in which a plurality of the third contact parts (22) and a plurality of the third non-contact parts (32) with respect to the bearing (5) are formed in the casing (6). Additionally, at least one of the plurality of the third non-contact parts (32) with respect to the bearing (5) has a peripheral length different from that of the other third non-contact parts (32).

The present invention provides a seventh problem-solving means which is an enclosed type compressor according to either the first problem-solving means or the second problem-solving means, in which the number of the first contact parts (20) with respect to the compression mechanism (2) differs from the number of the second contact parts (21) with respect to the electric motor (3).

The present invention provides an eighth problem-solving means which is an enclosed type compressor according to the third problem-solving means, in which the number of the first contact parts (20) with respect to the compression mechanism (2), the number of the second contact parts (21) with respect to the electric motor (3), and the number of the third contact parts (22) with respect to the bearing (5) differ from one another.

The present invention provides a ninth problem-solving means which is an enclosed type compressor according to either the first problem-solving means or the second problem-solving means, in which the number of the first non-contact parts (30) with respect to the compression mechanism (2) is neither a multiple nor a divisor of the number of the second non-contact parts (31) with respect to the electric motor (3).

The present invention provides a tenth problem-solving means which is an enclosed type compressor according to the third problem-solving means, in which the number of the first non-contact parts (30) with respect to the compression mechanism (2) is neither a multiple nor a divisor of the number of the second non-contact parts (31) with respect to the electric motor (3). Additionally, the number of the second non-contact parts (31) with respect to the electric motor (3) is neither a multiple nor a divisor of the number of the third non-contact parts (32) with respect to the bearing (5), and the number of the third non-contact parts (32) with respect to the bearing (5) is neither a multiple nor a divisor of the number of the first non-contact parts (30) with respect to the compression mechanism (2).

In the first to third problem-solving means, the electric motor (3) drives the compression mechanism (2) to rotate. The compression mechanism (2) sucks in low-pressure fluid and compresses it to a high pressure level. Thereafter, the compression mechanism (2) discharges the high-pressure fluid. During that period, the compression mechanism (2) and the electric motor (3) produce vibrations. The compression mechanism (2) and the electric motor (3) are in contact with the casing (6). Accordingly, the vibrations produced in the compression mechanism (2) and the electric motor (3) propagate to the contact parts of the casing (6), thereby causing the non-contact parts of the casing (6) to vibrate.

In the first problem-solving means, the peripheral length of the first non-contact part (30) with respect to the scroll type compression mechanism (2) differs from the peripheral length of the second non-contact part (31) with respect to the electric motor (3). Further, in the second problem-solving means the peripheral length of the first non-contact part (30) with respect to the compression mechanism (2) differs from the peripheral length of the second non-contact part (31) with respect to the electric motor (3). As a result of such arrangement, the frequency of vibration occurring when excitation force is applied to the first non-contact part (30) from the compression mechanism (2) differs from the frequency of vibration occurring when excitation force is applied to the second non-contact part (31) from the electric motor (3).

In the third problem-solving means, the peripheral length of the first non-contact part (30) with respect to the scroll type compression mechanism (2), the peripheral length of the second non-contact part (31) with respect to the electric motor (3), and the peripheral length of the third non-contact part (32) with respect to the bearing (5) differ from one another. As a result of such arrangement, the frequency of vibration occurring when excitation force is applied to the first non-contact part (30) from the compression mechanism (2), the frequency of vibration occurring when excitation force is applied to the second non-contact part (31) from the electric motor (3), and the frequency of vibration occurring when excitation force is applied to the third non-contact part (32) from the bearing (5) differ from one another.

In the fourth problem-solving means, at least one of the plural first non-contact parts (30) with respect to the compression mechanism (2) has a peripheral, length different from that of the other first non-contact parts (30). Accordingly, with respect to the compression mechanism (2), there is a difference in vibration frequency between the one the first non-contact part (30) and the other first non-contact parts (30).

In the fifth problem-solving means, at least one of the plural second non-contact parts (31) with respect to the electric motor (3) has a peripheral length different from that of the other second non-contact parts (31). Accordingly, with respect to the electric motor (3), there is a difference in vibration frequency between the one second non-contact part (31) and the other second non-contact parts (31).

In the sixth problem-solving means, at least one of the plural third non-contact parts (32) with respect to the bearing (5) has a peripheral length different from that of the other third non-contact parts (32). Accordingly, with respect to the bearing (5), there is a difference in vibration frequency between the one third non-contact part (32) and the other third non-contact parts (32).

In the seventh problem-solving means, the number of the first contact parts (20) with respect to the compression mechanism (2) is different from the number of the second contact parts (21) with respect to the electric motor (3). Accordingly, such a difference between the number of the first contact parts (20) and the number of the second contact parts (21) causes the number of the first non-contact parts (30) to differ from the number of the second non-contact parts (31). As a result, the frequency of vibration occurring in the first non-contact part (30) differs from the frequency of vibration occurring in the second non-contact part (31).

In the eighth problem-solving means, the number of the first contact parts (20) with respect to the compression mechanism (2), the number of the second contact parts (21) with respect to the electric motor (3), and the number of the third contact parts (22) with respect to the bearing (5) differ from one another. Accordingly, such differences among the number of the first contact parts (20), the number of the second contact parts (21), and the number of the third contact parts (22) cause the number of the first non-contact parts (30), the number of the second non-contact parts (31), and the number of the third non-contact parts (32) to differ from one another. As a result, the frequency of vibration occurring in the first non-contact part (30), the frequency of vibration occurring in the second non-contact part (31), and the frequency of vibration occurring in the third non-contact part (32) differ from one another.

In the ninth problem-solving means, the number of the first contact parts (20) with respect to the compression mechanism (2) is neither a multiple nor a divisor of the number of the second contact parts (21), and vice versa. If the numbers of these contact parts (20, 21) are in a multiple or a divisor relationship with each other, for example if the number of the second contact part (21) is twice the number of the first contact parts (20), there is the possibility that the secondary mode of vibration of the first non-contact part (30) and the primary mode of vibration of the second non-contact part (31) resonate. In the present problem-solving means, however, it is arranged such that the number of the second contact parts (21) is neither a multiple nor a divisor of the number of the first contact part (20), thereby preventing the occurrence of such resonance.

In the tenth problem-solving means, each of the number of the first contact parts (20) with respect to the compression mechanism (2), the number of the second contact parts (21) with respect to the electric motor (3), and the number of the third contact parts (22) with respect to the bearing (5) is neither a multiple nor a divisor of the other. Accordingly, the multi-modes of vibrations occurring in the first to third non-contact parts (30, 31, 32) will not resonate.

In the present invention, when vibrations occurring in the compression mechanism (2) and other components propagate to the casing (6), the vibrations are cancelled or averaged because the non-contact parts (30, 31, 32) differ from one another in vibration frequency. This, consequently, prevents sound of a particular frequency from being emitted noisily. Consequently, the reduction of vibration and the reduction of noise are achieved as a whole in the enclosed type compressor.

In the first problem-solving means, the peripheral length of the first non-contact part (30) with respect to the scroll type compression mechanism (2) differs from the peripheral length of the second non-contact part (31) with respect to the electric motor (3). Therefore, the frequency of vibration occurring in the first non-contact part (30) differs from the frequency of vibration occurring in the second non-contact part (31). Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the second problem-solving means, the peripheral length of the first non-contact part (30) with respect to the compression mechanism (2) differs from the peripheral length of the second non-contact part (31) with respect to the electric motor (3). Therefore, the frequency of vibration occurring in the first non-contact part (30) differs from the frequency of vibration occurring in the second non-contact part (31), as in the first problem-solving means. Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the third problem-solving means, the peripheral length of the first non-contact part (30) with respect to the scroll type compression mechanism (2), the peripheral length of the second non-contact part (31) with respect to the electric motor (3), and the peripheral length of the third non-contact part (32) with respect to the bearing (5) differ from one another. Therefore, the frequency of vibration occurring in the first non-contact part (30), the frequency of vibration occurring in the second non-contact part (31), and the frequency of vibration occurring in the third non-contact part (32) differ from one another. Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the fourth problem-solving means, at least one of the plural first non-contact parts (30) with respect to the compression mechanism (2) has a peripheral length different from that of the other first non-contact parts (30). Accordingly, the frequency of vibration occurring in the one first non-contact part (30) differs from the frequency of vibration occurring in the other first non-contact parts (30) because of the difference in peripheral length. Accordingly, these vibrations of different frequencies are cancelled or averaged, thereby preventing sound of a particular frequency from being emitted noisily. Consequently, the reduction of vibration and the reduction of noise are achieved as a-whole in the enclosed type compressor.

In the fifth problem-solving means, at least one of the plural second non-contact parts (31) with respect to the electric motor (3) has a peripheral length different from that of the other second non-contact parts (31). Accordingly, the frequency of vibration occurring in the one second non-contact part (31) differs from the frequency of vibration occurring in the other second non-contact parts (31) because of the difference in peripheral length. Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the sixth problem-solving means, at least one of the plural third non-contact parts (32) with respect to the bearing (5) has a peripheral length different from that of the other third non-contact parts (32). Accordingly, the frequency of vibration occurring in the one third non-contact part (32) differs from the frequency of vibration occurring in the other third non-contact parts (32) because of the difference in peripheral length. Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the seventh problem-solving means, the number of the first contact parts (20) with respect to the compression mechanism (2) differs from the number of the second contact parts (21) with respect to the electric motor (3). Therefore, the number of the first non-contact parts (30) differs from the number of the second non-contact parts (31), and the peripheral length of the first non-contact part (30) differs from the peripheral length of the second non-contact part (31). Accordingly, the frequency of vibration occurring in the first non-contact part (30) differs from the frequency of vibration occurring in the second non-contact part (31). These vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the eighth problem-solving means, the number of the first contact parts (20) with respect to the compression mechanism (2), the number of the second contact parts (21) with respect to the electric motor (3), and the number of the third contact parts (22) with respect to the bearing (5) differ from one another. Therefore, the number of the first non-contact parts (30), the number of the second non-contact parts (31), and the number of the third non-contact parts (32) differ from one another and, in addition, the peripheral length of the first non-contact part (30), the peripheral length of the second non-contact part (31), and the peripheral length of the third non-contact part (32) differ from one another. Accordingly, the frequency of vibration occurring in the first non-contact part (30), the frequency of vibration occurring in the second non-contact part (31), and the frequency of vibration occurring in the third non-contact part (32) differ from one another. Accordingly, these vibrations of different vibration frequencies are cancelled or averaged, thereby preventing sound of a particular frequency from being emitted noisily. Consequently, the reduction of vibration and the reduction of noise are achieved as a whole in the enclosed type compressor.

In the ninth problem-solving means, the multi-mode of vibration occurring in the first non-contact part (30) and the multi-mode of vibration occurring in the second non-contact parts (31) do not resonate, thereby effectively canceling the vibrations.

In the tenth problem-solving means, the multi-mode of vibration occurring in the first non-contact parts (30), the multi-mode of vibration occurring in the second non-contact parts (31), and the multi-mode of vibration occurring in the third non-contact part (32) do not resonate, thereby effectively canceling the vibrations.

Further, in accordance with the present invention, unlike conventional techniques there is no need for contact part extension for the purpose of improving casing rigidity. This makes it possible to sufficiently secure the non-contact parts (30, 31, 32). Accordingly, the movement of fluid in the inside of the casing (6) is not prevented, and there is no drop in the efficiency of fluid machinery.

Furthermore, in accordance with the present invention, there is no need to increase the thickness of a casing for the purpose of improving its rigidity, thereby preventing the increase in compressor weight itself. Additionally, some change in design allows conventionally-used constituent elements to be appropriated for the casing (6) et cetera, thereby making it possible to hold down the increase in the costs of production of the compressor itself.

DETAILED DESCRIPTION OF THE INVENTION

Hereinafter, embodiments of the present invention will be described in detail with reference to the drawings.

Figure 1:
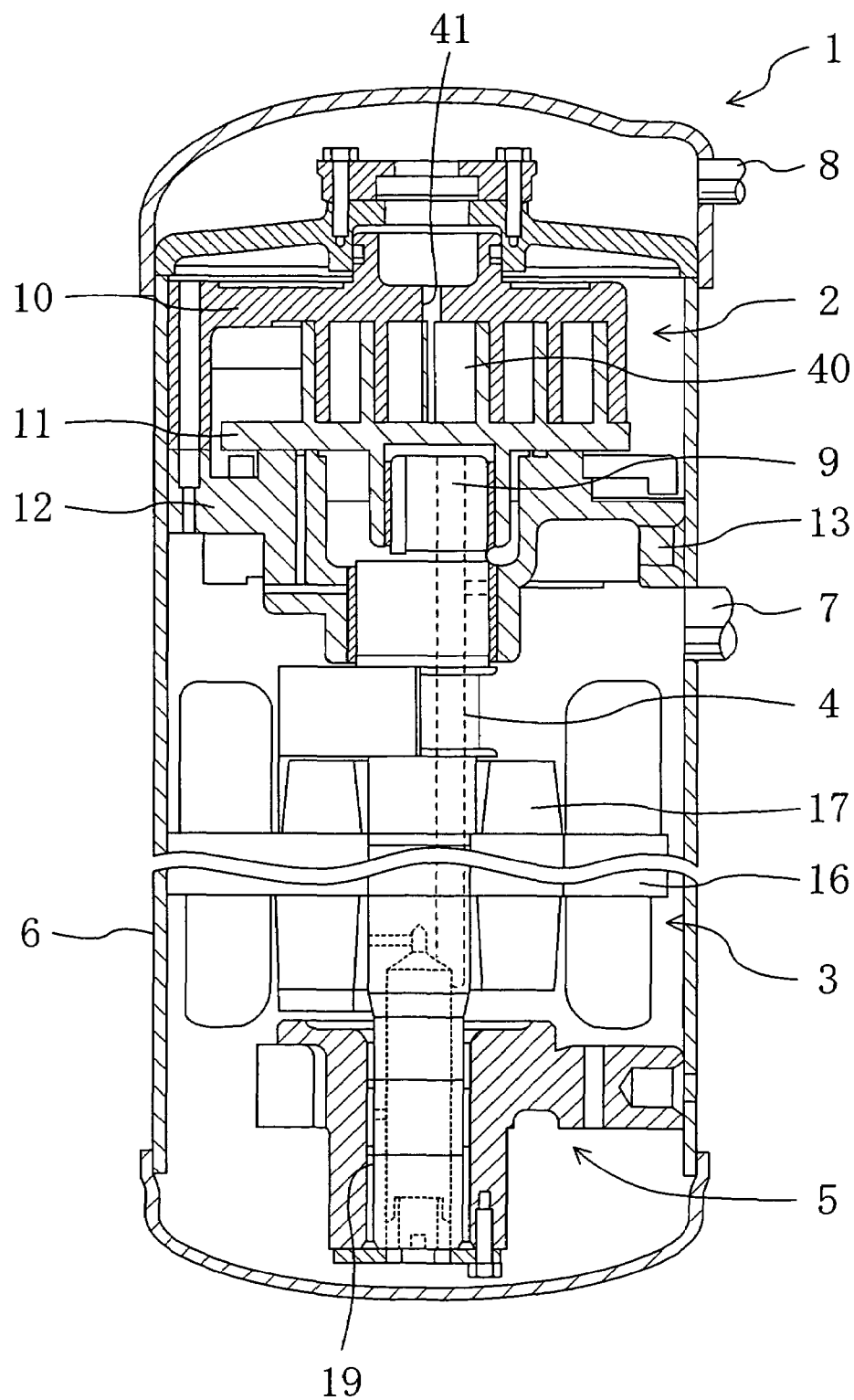
FIG. 1 is an entire cross-sectional view of an enclosed type compressor according to an embodiment of the present invention.

Referring to FIG. 1, there is shown an enclosed type compressor (1) according to an embodiment of the present invention. The enclosed type compressor (1) is a compressor which comprises a compression mechanism (2) which is a scroll type compression mechanism, an electric motor (3), a drive shaft (4), and a lower main bearing (5) which supports one end of the drive shaft (4). The enclosed type compressor (1) is disposed in a refrigerant circuit of an air conditioner or the like and is so constructed as to compress fluid refrigerant.

The electric motor (3) imparts, through the drive shaft (4), motive energy to the scroll type compression mechanism (2). The constituent components, namely, the scroll type compression mechanism (2), the electric motor (3), and the lower main bearing (5), are housed hermetically within a casing (6) substantially shaped like a cylinder. In the present embodiment, the enclosed type compressor (1) is a vertical type compressor. The scroll type compression mechanism (2) is disposed in an upper part of the inside of the casing (6). The lower main bearing (5) is disposed in a lower part of the inside of the casing (6). Disposed between the scroll type compression mechanism (2) and the lower main bearing (5) is the electric motor (3). A suction port (7) through which refrigerant is drawn is defined in a body section of the casing (6), i.e., a section between the scroll type compression mechanism (2) and the electric motor (3). On the other hand, a discharge port (8) through which refrigerant compressed is emitted is defined in a head section of the casing (6), i.e., a section above the scroll type compression mechanism (2).

Figure 2:
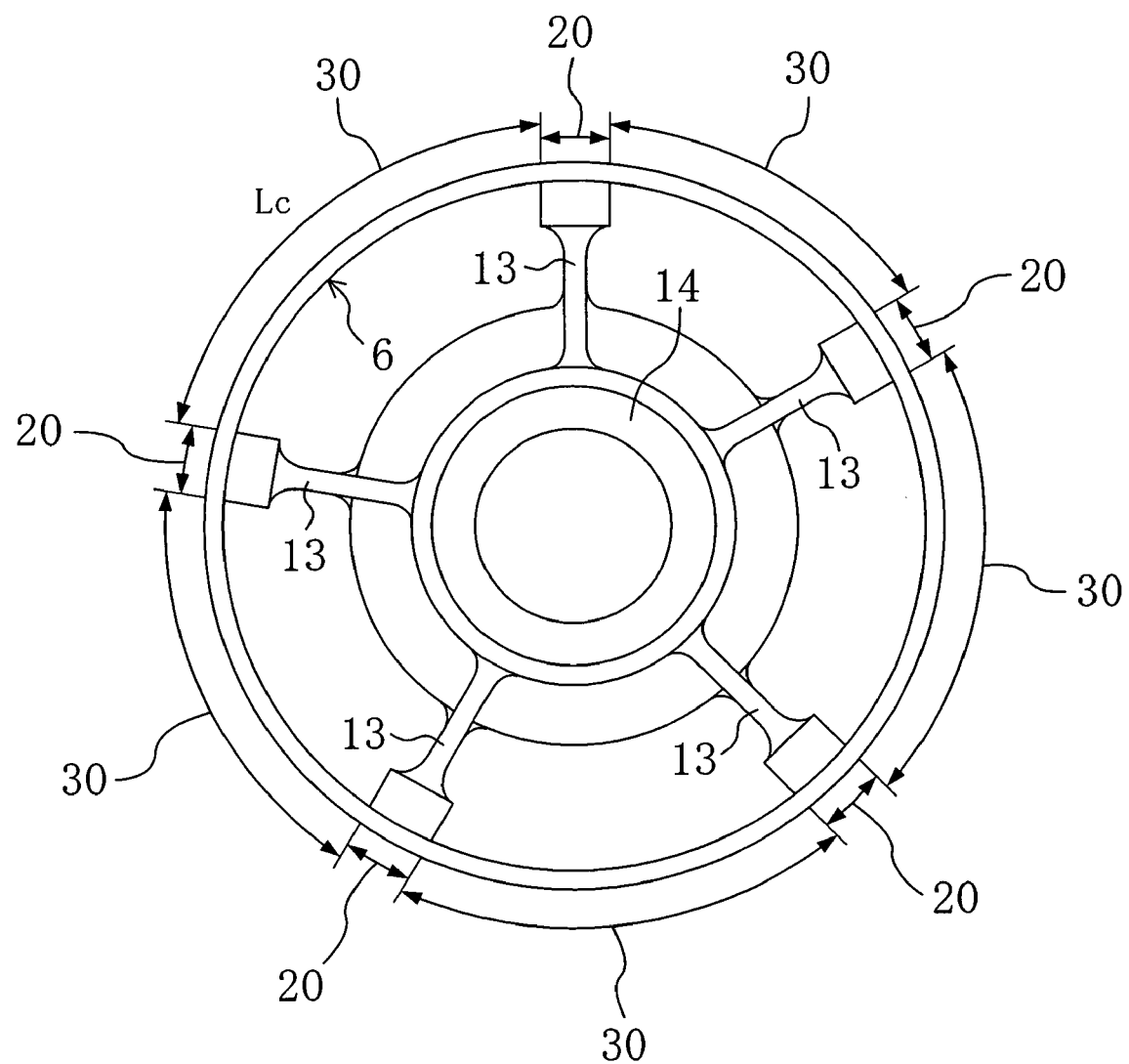
FIG. 2 is a schematic top plan view of a bearing housing of a scroll type compression mechanism according to an embodiment of the present invention.

In the present embodiment, the scroll type compression mechanism (2) includes a fixed scroll (10), a movable scroll (11), and a bearing housing (12). As can be seen from FIG. 2, the bearing housing (12) is provided with a circular seat portion (14) and leg portions (13) extending radially from the seat portion (14).

The fixed scroll (10) and the movable scroll (11) are each provided with a spiral lap. The fixed scroll (10) and the movable scroll (11) are arranged such that their laps engage with each other. Such engagement of the laps of the scrolls defines a compression chamber (40). A discharge opening (41) through which refrigerant compressed in the compression chamber (40) is discharged is defined centrally in the fixed scroll (10).

The fixed scroll (10) is attached firmly to the bearing housing (12). The movable scroll (11) is placed, through an Aldham's ring, in the seat portion (14) of the bearing housing (12). An eccentric portion (9) formed at a shaft end of the drive shaft (4) catches the back face of the movable scroll (11).

The scroll type compression mechanism (2) is fixed to the casing (6) by welding, with ends of the leg portions (13) of the bearing housing (12) in contact with an inner wall surface of the casing (6). The bearing housing (12) may be secured tightly to the casing (6) by other than welding, such as shrink fitting and press fitting.

The scroll type compression mechanism (2) is attached firmly to the casing (6) in the way described above. As a result, in a first plane orthogonal to the longitudinal direction of the casing (6) five first contact parts (20) at which the ends of the leg portions (13) formed in the bearing housing (12) of the scroll type compression mechanism (2) make contact with the casing (6) and five first non-contact parts (30) at which the bearing housing (12) does not make contact with the casing (6) are formed on the casing (6). These five first non-contact parts (30) of the scroll type compression mechanism (2) according to the present embodiment have the same length (Lc).

Figure 3:
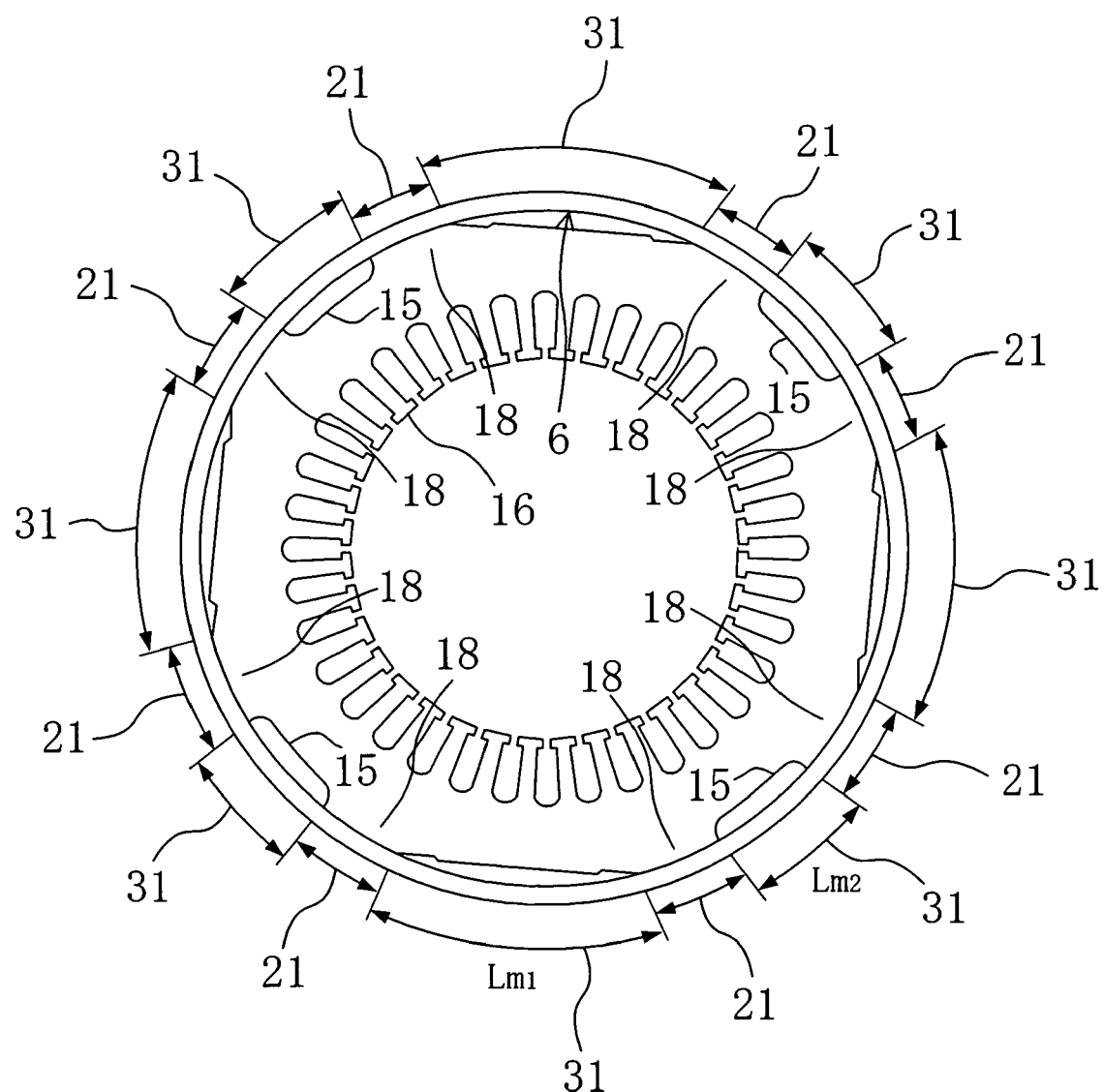
FIG. 3 is a schematic top plan view of a stator of an electric motor according to an embodiment of the present invention.

Referring again to FIG. 1, in the present embodiment the electric motor (3) is made up of a stator (16) and a rotor (17). As shown in FIG. 3, the stator (16), shaped like an octagonal prism, is formed by superimposing a large number of substantially octagon-shaped flat plates. Groove-like notch portions (15) and projecting portions (18) are formed in alternating manner, in every other side face of the octagonal prism. Defined centrally in the stator (16) is a cylindrical space into which the rotor (17) is inserted.

The electric motor (3) is attached firmly to the casing (6), with the projecting portions (18) of the stator (16) in contact with the inner wall surface of the casing (6). The stator (16) may be secured tightly to the casing (6) by known techniques such as press fitting and shrink fitting.

The electric motor (3) is attached firmly to the casing (6) in the way described above. As a result, in a second plane orthogonal to the longitudinal direction of the casing (6), eight second contact parts (21) at which each projecting portion (18) of the stator (16) makes contact with the casing (6) and eight second non-contact parts (31) at which the stator (16) does not make contact with the casing (6) because of the notch portions (15) of the stator (16) are formed on the casing (6). In the electric motor (3) of the present embodiment, of the eight second non-contact parts (31) four second non-contact parts (31) have a peripheral length of Lm1 and the remaining four second non-contact parts (31) have a peripheral length of Lm2. Further, the second non-contact parts (31) of the length Lm1 and the second non-contact parts (31) of the length Lm2 are alternately arranged.

Figure 4:
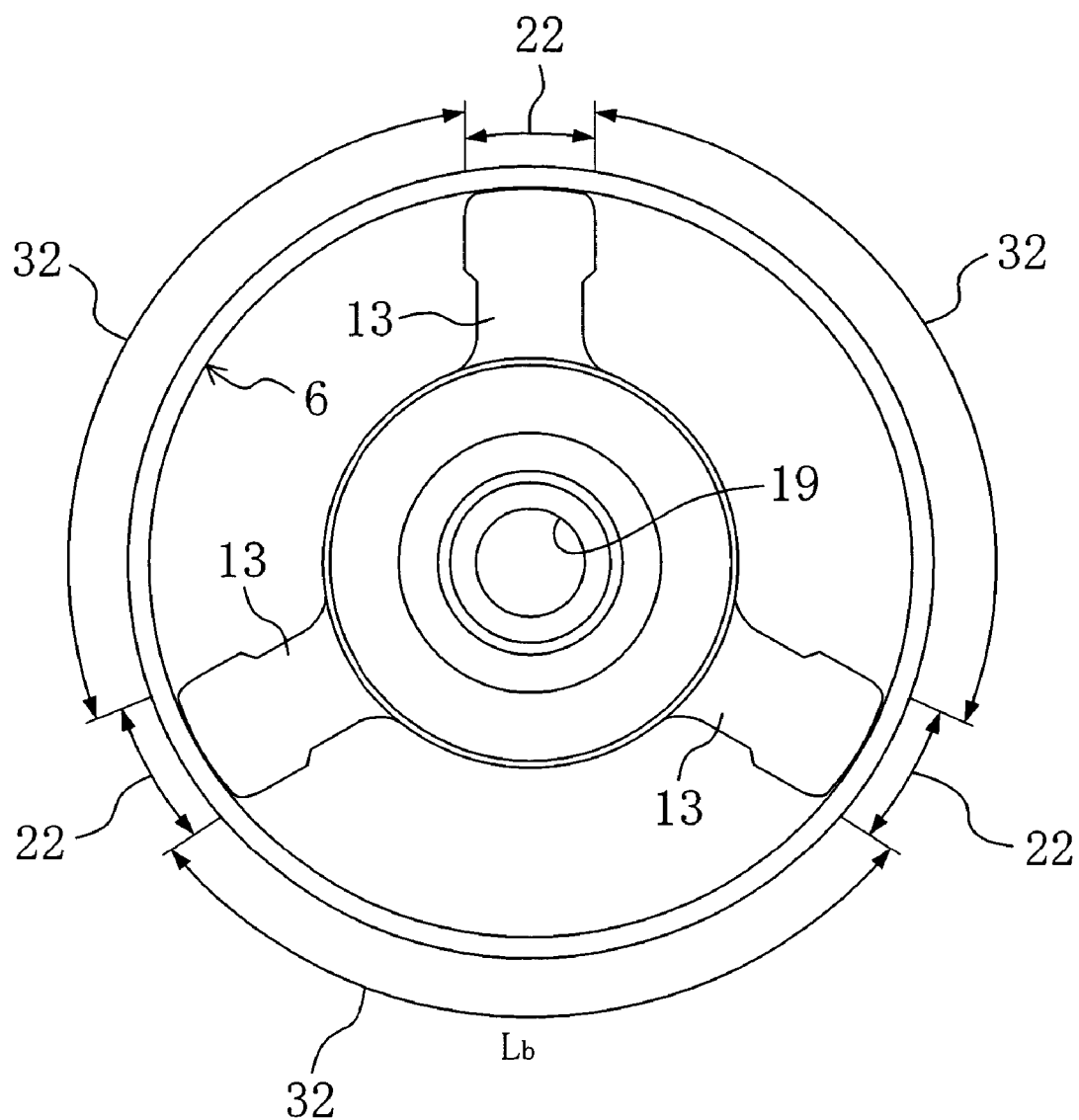
FIG. 4 is a schematic top plan view of a lower main bearing according to an embodiment of the present invention.

As shown in FIG. 4, the bearing (5) according to the present embodiment has a bearing portion (19) as the lower main bearing (5) and three leg portions (13) extending radially from the bearing portion (19). A lower end of the drive shaft (4) is inserted rotatably into the bearing portion (19) and is supported there.

The lower main bearing (5) is housed in the inside of the casing (6), with the lower end of the drive shaft (4) inserted into the bearing portion (19) and is attached firmly to the casing (6) by welding, with the ends of the leg portions (13) in contact with the inner wall surface of the casing (6). The lower main bearing (5) may be secured tightly to the casing (6) by other than welding, such as shrink fitting and press fitting.

The lower main bearing (5) is attached firmly to the casing (6) in the way described above. As a result, in a third plane orthogonal to the longitudinal direction of the casing (6), three third contact parts (22) at which each leg portion (13) of the lower main bearing (5) makes contact with the casing (6) and three third non-contact parts (32) at which the lower main bearing (5) does not make contact with the casing (6) are formed on the casing (6). These three third non-contact parts (32) with respect to the lower main bearing (5) according to the present embodiment have the same length (Lb).

In the enclosed type compressor (1) according to the present embodiment, the numbers of the non-contact parts (30, 31, 32) are as follows. The number of the first non-contact parts (30) in non-contact with the scroll type compression mechanism (2) is five. The number of the second non-contact parts (31) in non-contact with the electric motor (3) is eight. The number of the third non-contact parts (32) in non-contact with the lower main bearing (5) is three. The numbers of the non-contact parts (30, 31, 32) are neither a devisor nor a multiple.

It should be noted that the numbers of the non-contact parts (30, 31, 32) are not limited to the foregoing values. Other combinations of the numbers of the non-contact parts (30, 31, 32) may be used. For example, there is such a combination that the numbers of the non-contact parts (30, 31, 32) are five, four, and three, respectively. There is another combination in which the numbers of the non-contact parts (30, 31, 32) are five, seven, and three, respectively.

The operating action of the enclosed type compressor (1) will be described below.

When the electric motor (3) is driven, the rotor (17) starts rotating with respect to the stator (16) attached firmly to the casing (6). During that period, vibrations produced in the electric motor (3) propagate to the casing (6) by way of the projecting portions (18) of the stator (16).

When the drive shaft (4) starts rotating, the eccentric portion (9) formed at the shaft end of the drive shaft (4) rotates around the drive shaft (4). Rotational movement of the eccentric portion (9) causes the movable scroll (11) engaging the eccentric portion (9) to move around the fixed scroll (10). As a result of this, refrigerant from the suction port (7) is drawn into the compression chamber (40) of the scroll type compression mechanism (2). The refrigerant thus drawn is compressed when the volume of the compression chamber (40) is contracted toward the center with the revolution of the movable scroll (11).

With the volume variation of the compression chamber (40), the refrigerant is compressed to a high pressure and is discharged into the casing from the discharge opening (41) formed centrally in the fixed scroll (10). The discharged refrigerant is delivered to a refrigerant circuit through the discharge port (8) defined at a specific location of the casing (6). Then, the refrigerant is subjected to a condensation process step, to an expansion process step, and to an evaporation process step and thereafter is again drawn into the suction port (7) for compression. During that period, vibrations caused by friction between the fixed scroll (10) and the movable scroll (11) and by discharge pulsation of the high-pressure refrigerant propagate to the casing (6) by way of the bearing housing (12).

When the drive shaft (4) starts rotating, the bearing portion (19) of the lower main bearing (5) slides against the lower end of the drive shaft (4). At that time, vibrations caused by friction between the sliding surfaces and by run-out of the drive shaft (4) propagate to the casing (6) by way of the leg portions (13).

The vibrations propagated to the casing (6) from each of the constituent components will cause noise at the non-contact parts (30, 31, 32).

Since the enclosed type compressor (1) according to the present embodiment is constructed in the way as described above, the peripheral length Lc of the first non-contact part (30) for the compression mechanism (2), the peripheral length Lm1 of the second non-contact part (31) for the electric motor (3), the peripheral length Lm2 of the second non-contact part (31) for the electric motor (3), and the peripheral length Lb of the third non-contact part (32) for the lower main bearing (5) differ from one another. As a result, noise occurring at the first non-contact part (30), noise occurring at the second non-contact part (31), and noise occurring at the third non-contact part (32) differ in frequency from one another. This prevents only sound of a particular frequency of the noises occurring at the non-contact parts (30, 31, 32) from resonating and from being amplified. Further, sounds of different frequencies are averaged or cancelled, thereby reducing the noise of the enclosed type compressor (1) as a whole.

Furthermore, in the enclosed type compressor (1) according to the present embodiment sufficient spaces are secured between each leg portion (13) of the bearing housing (12), between the notch portions (15) formed in the side face of the stator (16), and between each leg portion (13) of the lower main bearing (5). As a result of such arrangement, movement of the refrigerant in the inside of the casing (6) will not be prevented and the drop in compression efficiency will not take place.

Further, it is possible to prevent not only the increase in weight of the enclosed type compressor (1) but also the increase in costs of the enclosed type compressor (1).

As other embodiments of the enclosed type compressors (1) of the second and third inventions, there is an enclosed type compressor in which the diameter of the casing (6) is varied. The body section of the casing (6) of the first embodiment is shaped like a cylinder having the same diameter from top to bottom. In stead of employing such a casing (6), the diameter of the casing (6) is varied at a location at which the scroll type compression mechanism (2) is attached firmly to the casing (6), at a location at which the electric motor (3) is attached firmly to the casing (6), and at a location at which the lower main bearing (5) is attached firmly to the casing (6).

As a result of such arrangement, the first non-contact part (30), the second non-contact part (31), and the third non-contact part (32), which differ in their peripheral length from one another, are formed in a first, a second, and a third plane, respectively.

In other words, a first contact part (20) which makes contact with the scroll type compression mechanism (2) and a first non-contact part (30) which does not make contact with the scroll type compression mechanism (2) are formed in the first plane orthogonal to the longitudinal direction of the casing (6). A second contact part (21) which makes contact with the electric motor (3) and a second non-contact part (31) which does not make contact with the electric motor (3) are formed in the second plane orthogonal to the longitudinal direction of the casing (6). A third contact part (22) which makes contact with the bearing (5) and a third non-contact part (32) which does not make contact with the bearing (5) are formed in the third plane orthogonal to the longitudinal direction of the casing (6).

In this case, even when the number of the first non-contact parts (30), the number of the second non-contact parts (31), and the number of the third non-contact part (32) are the same, the diameter of the casing (6) is varied depending on the locations of these non-contact parts. As a result, the first to third non-contact parts (30, 31, 32) have different peripheral lengths, whereby the same effects that the aforesaid embodiment provides can be obtained.

Furthermore, as other embodiments of the first and second inventions, there is an embodiment which does not include the lower main bearing (5) in the inside of the casing (6).

Further, as another embodiment of the enclosed type compressor (1) according to the second embodiment, a rotary type compression mechanism may be employed in place of the scroll type compression mechanism (2).

The enclosed type compressor (1) of the present invention is a compressor disposed in a refrigerant circuit. However, the enclosed type compressor (1) may of course be a compressor for compressing various types of fluids.

As has been described, the present invention provides an enclosed type compressor which proves useful when employed in airconditioners and refrigerating machines. The enclosed type compressor of the present invention is suitably used particularly in cases where a compression mechanism and an electric motor are attached firmly to a casing.

What is claimed is:

1. An enclosed type compressor comprising:
a scroll type compression mechanism;
an electric motor for driving said compression mechanism; and
an enclosed external cylindrical casing for housing said compression mechanism and said electric motor, in which said compression mechanism and said electric motor are attached firmly to said casing, with said compression mechanism and said electric motor in contact with an inside face of said casing,
said casing being in contact with said compression mechanism in a first contact part and being out of contact with said compression mechanism in a first non-contact part in a first plane orthogonal to the longitudinal direction of said casing, a plurality of said first contact parts and a plurality of said first non-contact parts with respect to said compression mechanism being formed in said casing, and at least one of said plurality of said first non-contact parts with respect to said compression mechanism having a peripheral length different from that of the other first non-contact parts,
said casing being in contact with said electric motor in a second contact part and being out of contact with said electric motor in a second non-contact part in a second plane orthogonal to the longitudinal direction of said casing, and
said first non-contact part and said second non-contact part having different peripheral lengths.

2. An enclosed type compressor comprising:
a compression mechanism;
an electric motor for driving said compression mechanism; and
an enclosed external casing for housing said compression mechanism and said electric motor, in which said compression mechanism and said electric motor are attached firmly to said casing, with said compression mechanism and said electric motor in contact with an inside face of said casing,
said casing being in contact with said compression mechanism in a first contact part and being out of contact with said compression mechanism in a first non-contact part in a first plane orthogonal to the longitudinal direction of said casing, a plurality of said first contact parts and a plurality of said first non-contact parts with respect to said compression mechanism being formed in said casing, and at least one of said plurality of said first non-contact parts with respect to said compression mechanism having a peripheral length different from that of the other first non-contact parts, said casing being in contact with said electric motor in a second contact part and being out of contact with said electric motor in a second non-contact part in a second plane orthogonal to the longitudinal direction of said casing, and said first non-contact part and said second non-contact part having different peripheral lengths.

3. An enclosed type compressor comprising:

a scroll type compression mechanism;

an electric motor for driving said compression mechanism;

a bearing for supporting one end of a drive shaft connecting said compression mechanism and said electric motor; and an enclosed external casing for housing said compression mechanism, said electric motor, and said bearing, in which said compression mechanism, said electric motor, and said bearing are attached firmly to said casing, with said compression mechanism, said electric motor, and said bearing in contact with an inside face of said casing, said casing being in contact with said compression mechanism in a first contact part and being out of contact with said compression mechanism in a first non-contact part in a first plane orthogonal to the longitudinal direction of said casing, a plurality of said first contact parts and a plurality of said first non-contact parts with respect to said compression mechanism being formed in said casing, and at least one of said plurality of said first non-contact parts with respect to said compression mechanism having a peripheral length different from that of the other first non-contact parts, said casing being in contact with said electric motor in a second contact part and being out of contact with said electric motor in a second non-contact part in a second plane orthogonal to the longitudinal direction of said casing, said casing being in contact with said bearing in a third contact part and being out of contact with said bearing in a third non-contact part in a third plane orthogonal to the longitudinal direction of said casing, and said first non-contact part, said second non-contact part, and said third non-contact part having different peripheral lengths, respectively.

4. The enclosed type compressor of any one of claims 1–3, wherein a plurality of said second contact parts and a plurality of said second non-contact part with respect to said electric motor are formed in said casing, and wherein at least one of said plurality of said second non-contact parts with respect to said electric motor has a peripheral length different from that of the other second non-contact parts.

5. The enclosed type compressor of claim 3, wherein a plurality of said third contact parts and a plurality of said third non-contact parts with respect to said bearing are formed in said casing, and wherein at least one of said plurality of said third non-contact parts with respect to said bearing has a peripheral length different from that of the other third non-contact parts.

6. The enclosed type compressor of claim 1 or claim 2, wherein the number of said first contact parts differs from the number of said second contact parts.

7. The enclosed type compressor of claim 3, wherein the number of said first contact parts, the number of said second contact parts, and the number of said third contact parts differ from one another.

8. The enclosed type compressor of either claim 1 or claim 2, wherein the number of said first non-contact parts is neither a multiple nor a divisor of the number of said second non-contact parts.

9. The enclosed type compressor of claim 3, wherein the number of said first non-contact parts is neither a multiple nor a divisor of the number of said second non-contact parts, the number of said second non-contact parts is neither a multiple nor a divisor of the number of said third non-contact parts, and the number of said third non-contact parts is neither a multiple nor a divisor of the number of said first non-contact parts.

* * * * *

UNITED STATES PATENT AND TRADEMARK OFFICE
CERTIFICATE OF CORRECTION

| | | |
|---|---|---|
| PATENT NO. | : 7,044,719 B2 | Page 1 of 1 |
| APPLICATION NO. | : 10/476595 | |
| DATED | : May 16, 2006 | |
| INVENTOR(S) | : Masanori Yanagisawa et al. | |

It is certified that error appears in the above-identified patent and that said Letters Patent is hereby corrected as shown below:

On the cover page,
(56) References Cited
FOREIGN PATENT DOCUMENTS, line 8, change from "(JP)    5-177757    7/1996"    to    -- (JP)    8-177757    7/1996 --

Signed and Sealed this

Tenth Day of October, 2006

JON W. DUDAS
*Director of the United States Patent and Trademark Office*